United States Patent [19]

Hoshino

[11] Patent Number: 4,949,928
[45] Date of Patent: Aug. 21, 1990

[54] ROTATABLE HOLDER WITH POSITION MEMORY

[75] Inventor: Yoshihiro Hoshino, Nagoya, Japan

[73] Assignee: Hoshino Gakki Co., Ltd., Japan

[21] Appl. No.: 422,999

[22] Filed: Oct. 17, 1989

[30] Foreign Application Priority Data

Oct. 20, 1988 [JP] Japan .............................. 63-137026[U]

[51] Int. Cl.⁵ .............................................. B61L 11/04
[52] U.S. Cl. .................................... 248/286; 248/291; 248/122; 269/76
[58] Field of Search .............. 248/291, 286, 184, 185, 248/122, 124; 403/97; 269/74, 76; 84/327, 453, 328

[56] References Cited

U.S. PATENT DOCUMENTS

| | | | |
|---|---|---|---|
| 2,947,054 | 8/1960 | Adams | 248/291 |
| 3,252,358 | 5/1966 | Moncrieff | 269/74 |
| 3,505,515 | 4/1970 | Adra | 248/291 |
| 4,018,412 | 4/1977 | Kees, Jr. et al. | 248/286 X |
| 4,047,684 | 9/1977 | Kobayashi | 248/122 |
| 4,196,821 | 4/1980 | Teti, Jr. et al. | 248/291 X |
| 4,747,569 | 5/1988 | Hoshino | 248/286 |
| 4,807,935 | 2/1989 | King | 248/291 X |
| 4,858,868 | 8/1989 | Hoffelner | 248/291 |

FOREIGN PATENT DOCUMENTS 63-122396 8/1988 Japan .

Primary Examiner—David L. Talbott
Assistant Examiner—D. J. Hulseberg
Attorney, Agent, or Firm—Ostrolenk, Faber, Gerb & Soffen

[57] ABSTRACT

A rotatable holder with position memory particularly useful for restoring a memorized orientation for a support rod for an article. The holder has a fixed part and a rotatable part rotatable on the fixed part. First gearing on the rear of the rotary part meshes with second gearing on the front of the fixed part when a securing bolt moves them together, preventing rotation of the rotary part. Lossening of the securing bolt frees the rotary part to rotate. The rotary part includes a rearwardly extending protrusion with its internally gear toothed. A memory ring disposed inside that protrusion and has peripheral gearing which meshes with the gearing in the protrusion, so that the memory ring rotates with the rotary part. The memory ring is biased by a spring rearwardly along the protrusion to disengage the memory ring from the gear toothing when the securing bolt is loosened, which would enable free adjustment of the rotary part with respect to the fixed part. But with the memory ring gearing in engagement with the gearing inside the protrusion, and with the securing bolt permitting disengagement of the first and second gearing, the memory ring rotates with the rotatable part. To restore the rotatable part to its original orientation, the memory ring is rotated and this rotates the rotatable part to its original orientation. A stop on the fixed part determines the extent of rotation of the memory ring.

15 Claims, 4 Drawing Sheets

ROTATABLE HOLDER WITH POSITION MEMORY

BACKGROUND OF THE INVENTION

The present invention relates to a rotatable holder, such as a holder for a musical instrument on a stand, and the invention particularly relates to a mechanism for memorizing the rotary orientation of the rotary member of the holder for enabling return to that rotary orientation. The invention is particularly suitable for use as a holder for percussion musical instruments, such as tom tom drums, cymbals, etc., but the invention is not limited to that use. In general, the holder comprises a relatively stationary, non-rotating, fixed mounting part which supports a relatively rotatable part, which, in turn, holds an article, such as a musical instrument. A rod projecting from the rotatable part supports the instrument. The rotatable part may be rotated to a desired or preselected orientation for setting the orientation of the rod and of the musical instrument carried on the rod.

A musical instrument holder over which the invention is an improvement, for example, is disclosed in Japanese Utility Model Publication No. 63-122396, corresponding to U.S. Pat. No. 4,747,569. The holder arranges the musical instrument, such as a tom tom or cymbal, at a prescribed orientation for use during the performance. The holder includes a rotatable part supported on a fixed part. The rotatable part includes a musical instrument holding part, like a rod. The rotatable part is held on the fixed part, so as to be freely rotatable to the desired orientation, by tightening means which are subsequently tightened to the rotatable part against rotation, at a selected angular orientation. The performer delicately adjusts the position of the supported instrument by adjusting the rotary angle of the rotatable part with respect to the fixed part.

When the assembled drum set, and particularly the holder, is dismantled for storage or transport or is folded up, the holder, and particularly the instrument supporting rod of the holder, is rotated to a desired storage orientation. When the drum set is set up again for use, it is necessary to readjust the angular orientation of the instrument supporting rod, by adjusting the rotation angle of the rotatable part. Again, that adjustment is delicate and time consuming for the performer. To avoid those problems of the set up, some performers leave a mark on the rotatable part of the holder to know how to orient it. However, such a mark may sometimes be erased, and in any event, the marking will dirty the rotatable part.

SUMMARY OF THE INVENTION

It is the object of the invention to provide a holder for an object, particularly a holder for a musical instrument, including a rotatable part which is readily indexed with respect to a fixed part on which it is mounted.

A more particular object is to provide a mechanism that memorizes the position of the rotatable part with respect to the fixed part so that their desired relative angular orientations may be easily reestablished.

A related object of the invention is to permit a holder, particularly for a musical instrument, to be dismantled or folded up and to be readily and rapidly reassembled at the correct orientation for the object, that is the instrument, being held.

It is another object of the invention to enable the rotatable part of the holder to be rotated and then indexed to a predetermined memorized angular position with respect to the fixed part.

Another object of the invention is to use an indexing device to predictably determine the angular position of the rotary part of a holder with respect to the fixed part.

A further object is to reduce the time that is required to set up the instrument holder with its rotatable part at a selected orientation.

According to the invention, a memory means returns a holder for an object, particularly the rotatable part of the holder, to a preselected rotative or angular orientation. The holder includes a relatively rotatable part and a relatively fixed part with which the relatively rotatable part cooperates and with respect to which the rotatable part is selectively freely rotatable or securely locked against rotation. The rotatable part has an appropriate clamping means for receiving and clamping the rod or other support for an object. The rotatable part has a rearwardly facing surface that faces toward the fixed part. The rear of the rotatable part is provided with an arcuate first engagement surface, particularly a first gearing surface. The fixed part has a front surface for cooperating with the rear surface of the rotatable part. The front surface of the fixed part has a cooperating second engagement surface, particularly a second gearing surface, for cooperating with the first gearing surface on the rear of the rotatable part. That engagement locks the rotatable part at a fixed orientation with respect to the fixed part when the fixed and rotatable parts are tightly secured together.

The rotatable part is freely rotatable with respect to the fixed part and is held to the latter by tightening means that draw the parts together selectively more or less tightly, as described below.

The rotatable part has a sleeve like protrusion that extends rearwardly toward the fixed part. The protrusion has a third engagement surface, particularly in the form of radial toothing or third gearing, defined on the interior of its sleeve. The third gearing has a first region of relatively smaller diameter further inward from the rear of the rotatable part and a second region of relatively greater diameter closer to the rear of the rotatable part. The third gearing may gradually widen in diameter taperingly toward the rear of the rotatable part.

A step is defined at one or more angular locations around the front surface of the fixed part. The step defines an indexing position for a radial protrusion from the below described memory ring.

A rotatable part position memory means, having the form of a memory ring, is disposed inside the sleeve of the protrusion of the rotary part. The ring has an open central region which passes over and is freely rotatable about a guide axle inside the protrusion. The ring has a fourth engagement surface on its periphery, which is particularly in the form of a radially toothed periphery with fourth gearing. The memory ring is selectively movable between two positions forward and rearward along the axle. The fourth gearing on the memory ring meshes with the internal toothing third gearing inside the protrusion on the rotatable part when the memory ring is moved forward, away from the rear of the protrusion. The fourth gearing on the periphery of the memory ring is out of engagement with the third gearing inside the protrusion when the memory ring is moved rearwardly along the axle in the protrusion. A spring normally urges the memory ring rearwardly.

The fixed part has a cooperating press element which presses the memory ring forward inside the protrusion to the third and fourth gearing meshing position, which locks the memory ring to the rotatable part when the rotatable part and the fixed part are tightened together. The memory ring has a stop engaging radial protrusion for being brought into engagement with the stop on the fixed member.

With the first and second engagement surfaces and the third and fourth engagement surfaces out of engagement and with the memory ring protrusion resting on the step on the fixed member, the desired orientation of the rotatable part with respect to the fixed part, for being remembered, is established. Then the rotatable part and the fixed part are fully tightened together. This locks the rotatable part and the fixed part in their selected angular orientation and all of the engageable surfaces or gearing on the fixed and rotatable parts and the memory ring lock them against relative rotation, as well.

To temporarily reorient the rotatable part with respect to the fixed part, e.g. during storage or transport of the holder, while retaining the previously established angular orientation in memory for subsequent recall, the fixed and rotatable parts are only partially loosened, rather than being completely loosened, sufficient to permit the previously engaged first and second engagement surfaces to separate, which permits relative rotation between the fixed and rotatable parts, but not far enough to separate the fourth gearing at the periphery of the memory ring from the third gearing inside the protrusion. Now the rotatable part can be rotated to a desired orientation, and the cooperating gear mesh between the rotatable part protrusion and the memory ring rotates the memory ring along with it. When the storage orientation is established, the fixed and rotatable parts can be retightened together, preventing them from moving out of their storage orientation, if desired.

When the storage or transport is completed and the rotatable and fixed parts should be reestablished in their previous orientations, if the rotatable and fixed parts have been secured at a storage orientation, that securement is released sufficiently to separate the first and second engagement surfaces between the fixed and rotatable parts, but not sufficiently to release the mesh between the memory ring and the protrusion. Then the memory ring is rotated until its radial protrusion abuts the step on the fixed part, which reestablishes the desired remembered orientation between the rotatable and fixed parts. Thereafter, they are tightened securely together at their desired orientations.

Other objects and features of the present invention will become apparent from the following description of a preferred embodiment of the invention considered in conjunction with the accompanying drawings.

DESCRIPTION OF THE PREFERRED EMBODIMENT

Figure 1:
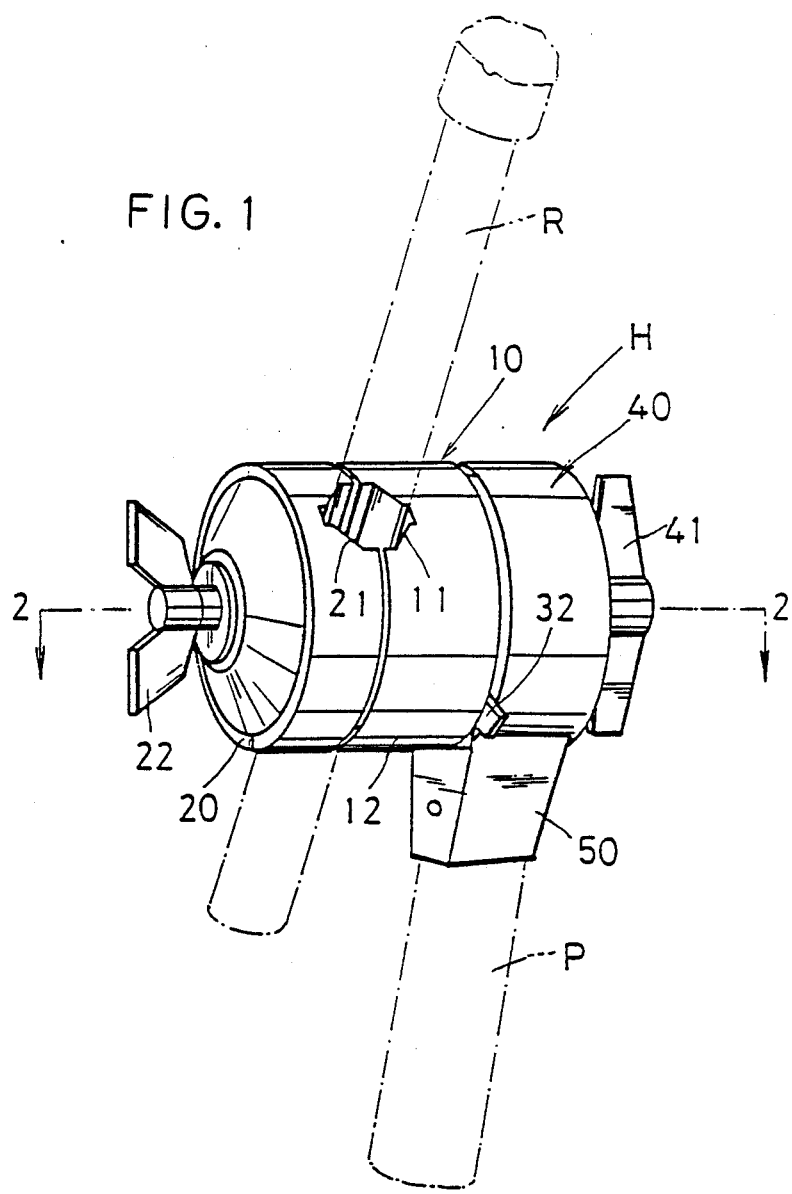
FIG. 1 is a perspective view of an article holder provided with a rotary position memorization mechanism or indexing device for the rotatable part, according to the invention.

FIG. 1 shows a holder H according to the present invention, which is useful for supporting a musical instrument but is not limited to that application. The holder comprises a rotatable part 10 which comprises the cooperating axially adjacent holding parts 11 and 21 for securing a musical instrument holding rod R, and the holder further comprises a fixed part 40 having an installation stem 50 for attachment to the main post P of a stand on which the holder is disposed. (See also FIGS. 7(a) and 7(b)). The rotatable part 10 is held to the fixed part 40 in a freely rotatable manner through a tightening bolt 41 which is tightened to clamp the rotatable part at a selected angular orientation. This, in turn, sets the angle of incline of the rod R supported in the rotatable part.

Figure 2:
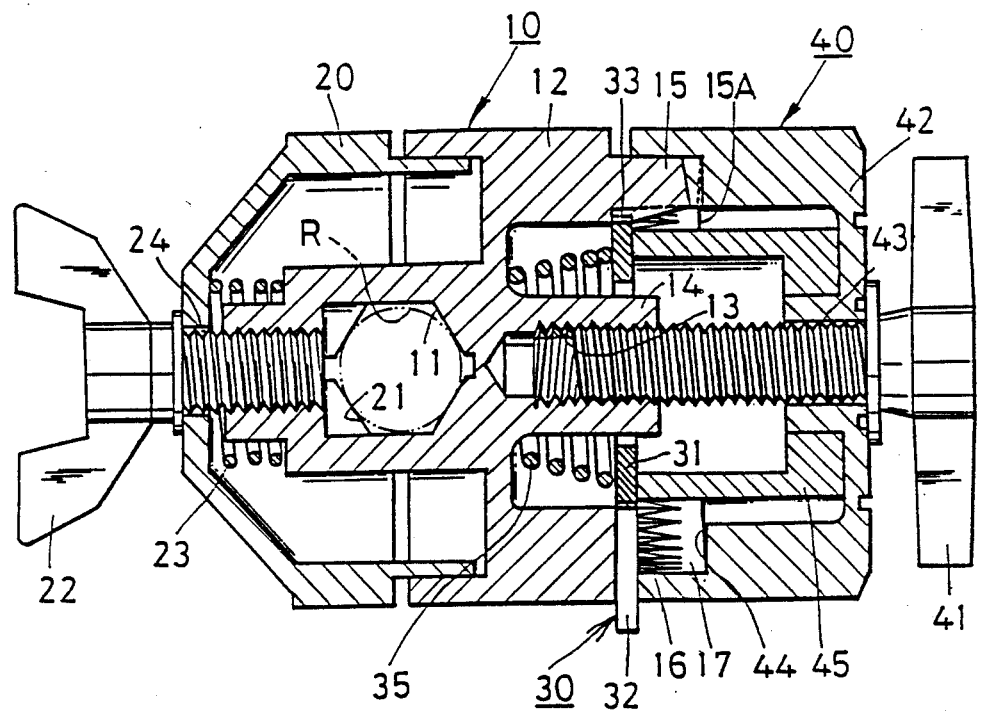
FIG. 2 is a cross-sectional view of the holder taken along the line of and in the direction of the arrows 2 in FIG. 1.

As shown in FIG. 2, the rotatable part 10 comprises a main body 12 that has a rod holding axial surface 11 at one side of a recess in the body 12 and further comprises a tightening part 20 that includes a rod holding axial surface 21 that is opposite the surface 11. The tightening part 20 is joined with the main body 12 by a bolt 22 which passes through a screw hole 24 in the part 20. When the bolt 22 is tightened, this presses the instrument holding rod R between the surfaces 11 and 21. Coil spring 23 is provided between the main body 12 and the tightening part 20 keeping them from vibrating and eliminating play.

At approximately the center of the main body 12, there is a rearwardly projecting axial guide protrusion 14 that has a central screw hole 13 to receive the tightening bolt 41 that runs through the fixed part 40 to secure the fixed and rotatable parts together. That protrusion 14 is also of a diameter to serve as a guide axle for the below described memory ring 30.

Figure 3:
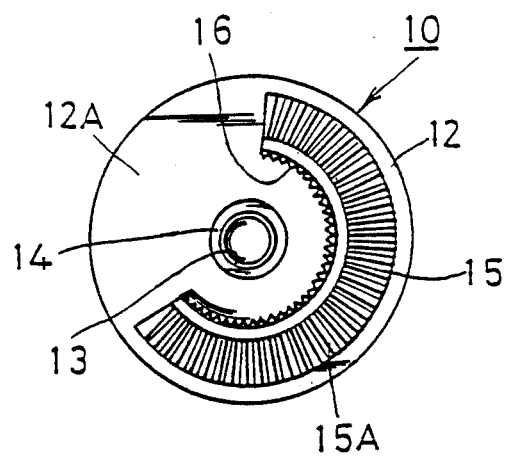
FIG. 3 is a front view of the rotatable part of the holder.

An arcuately, partial annularly shaped, rearwardly projecting, sleeve-like engaging protrusion 15, which is to engage the front surface of the fixed part 40, is disposed radially outward of the guide protrusion 14. The protrusion 15 is not a complete ring, as it does not extend over the quadrant at the upper left in FIGS. 3 and 7. This provides a clearance for the operating protrusion 32 of the memory ring 30, as described below. The engaging protrusion 15 has a fixed part engagement surface at its rear side that is engageable with the fixed part 40. That engagement surface is formed as a first gearing surface 15A for making the engagement effective and accurate.

In addition, a partial annular, third gearing surface 16 is provided on the inner periphery of the protrusion 15. It extends over the same arc as its protrusion 15. The surface 16 comprises radially directed convexes and concaves or gear teething. The third gearing surface 16 is generally formed in a tapered shape in the axial direction, tapering radially wider in diameter rearward of the protrusion 15 toward its open large diameter part 17, as shown in the cross section of the arcuately shaped protrusion 15 in FIG. 6. The radius of the inner or forward first opening part 18 of the gearing surface 16 is smaller than the radius of the open large diameter second opening part 17.

Figure 4:
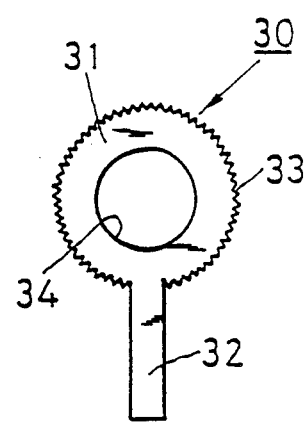
FIG. 4 is a front view of the memory ring for the holder.

As shown in FIG. 2, a memory ring 30 is resiliently supported, between a spring 35 at its front side and by a holding part 45 at its rear side, inside of the arcuate protrusion 15. As shown in FIG. 4, the memory ring 30, has an outer periphery that is in the form of a toothed fourth gearing surface 33 that meshes with the third gearing surface 16 on the inner periphery of the protrusion 15. The largest diameter of the fourth gearing surface 33 is smaller than the open large diameter part 17 of the opening into the protrusion, so that when the memory ring is urged to the rear, that is to the right in FIGS. 2 and 6, the gearing surface 33 is out of mesh with the gearing surface 16. The diameter of the opening 34 into the main body of the memory ring is made larger than the diameter of the guide protrusion 14 that is provided at the center of the rotatable part so that the ring may rotate freely around that protrusion.

A radially extending, fixed part stop engaging and operating protrusion 32 projects from the memory ring body 31. The length of the protrusion 32 is such that its tip extends several millimeters beyond the outer periphery of the main body 12 of the rotatable part to both serve as an indicator of the orientation of the memory ring and to be easily operated from outside the holder.

The memory ring 30 is oriented around the protrusion 15 such that its operating protrusion 32 extends past the arcuate region 12A where the arcuately shaped protrusion 15 and the gearing surface 16 are absent.

Figure 5A:
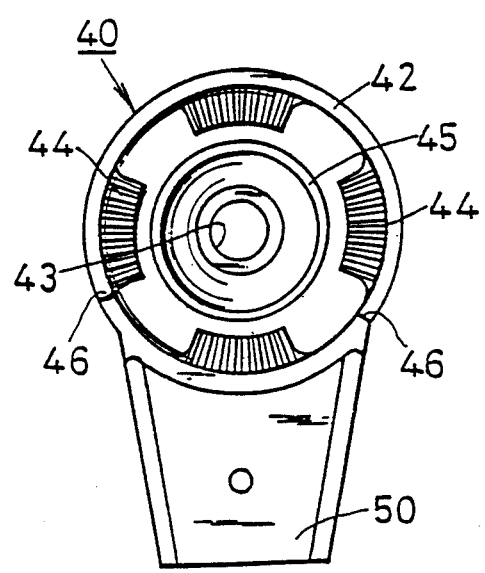
FIG. 5(a) is a front view of the fixed part of the holder.
Figure 5B:
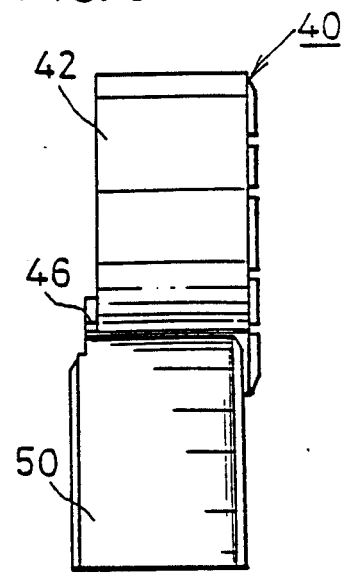
FIG. 5(b) is a side view of the fixed part.

The fixed part 40 has a round, central hole 43 for receiving the tightening bolt 41 at the center of its main body 42, as shown in FIGS. 2 and 5. Four arcuately spaced apart second gearing surface sections 44 of the fixed part are partially formed inside the main body 42 at the front side for engaging the first gearing surface 15A at the rear of the arcuately shaped protrusion 15.

The tightening bolt 41 is screwed into the screw hole 13 in the protrusion 14 through the hole 43 from outside the main body.

Figure 6:
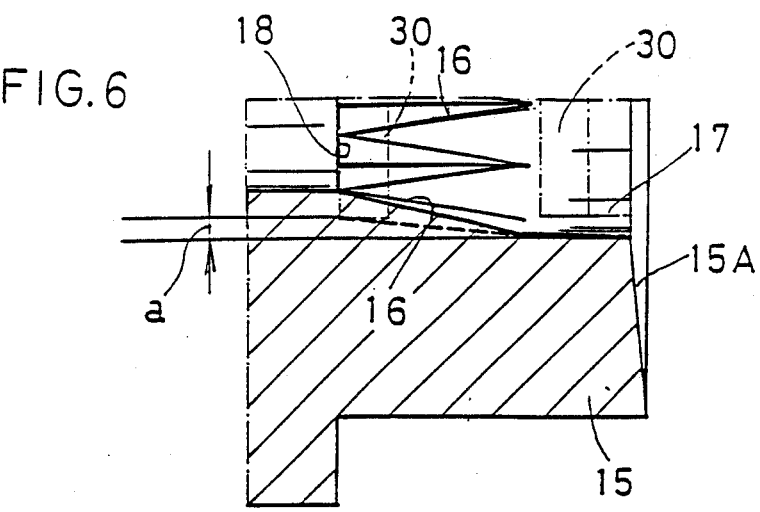
FIG. 6 is a schematic view showing an enlarged fragmentary cross-section of an arcuate protrusion formed on the rotatable part.

Radially inside the main body 42 of the fixed part 40, there is a ring shaped, forwardly projecting holding part 45 that presses the main ring body 31 of the memory ring 30 to the left in FIGS. 2 and 6, in opposition to the bias of the spring 35. This meshes the fourth gearing surface 33 to the third gearing surface 16.

An engaging step 46 is located at both lower quadrants at both sides of the main body 42 of the fixed part for being engaged by the operating protrusion 32 of the memory ring. The axial height of the step 46 is somewhat greater than the thickness of the memory ring 30.

The operation of the apparatus is now described. The memory ring 30 is biased rearwardly toward the fixed part 40 by the spring 35. The gearing surface 33 on the outer periphery of the ring is biased rearwardly out of mesh with, but can be moved forwardly into mesh with, the gearing surface 16 on the inner periphery of the engaging protrusion 15. The rotatable part 10 is held to rotate with the fixed part 40 due to the cooperation of the gearing surfaces 15A and 44. When the bolt 41 is fully tightened, the holding part 45 of the fixed member presses the main body 31 of the memory ring in opposition to the bias of the spring 35, as shown in FIG. 2, which brings the gearing surface 33 into mesh with the gearing surface 16.

When the tightening bolt 41 is loosened from the fully tightened state, the gear mesh between the rotatable part 10 and the fixed part 40 is at first released. This releases the rotatable part 10 to be freely rotatable while it is still locked to rotate together with the memory ring 30. Because the operating protrusion 32 of the memory ring 30 is engaged with the engaging step 46 on the fixed part, however, the ring 30 and protrusion 32 can be rotated only in the direction away from the step 46. The operating protrusion 32 of the memory ring 30 acts as a stopper that regulates the angle of rotation of the rotatable part 10. In addition, the angular position at which the operating protrusion 32 engages the step 46 is the position of the memory ring and of the rotatable part that has been memorized. After the rotatable part 10 and the fixed part 40 are partially released, enough to rotate, as for storage or transport, the memory ring gearing surface 33, which is still in gear mesh with the gearing surface 16 in the protrusion 15 in the rotatable part, rotates along with the rotatable part 10. When the rotatable and fixed parts are to be reassembled rigidly, the memory ring protrusion 32 is first moved to abut the step 46, which is the memory position for member 10. The correct orientation of the rotatable part has been reestablished. Now, the tightening bolt 41 is fully retightened.

Figure 7A:
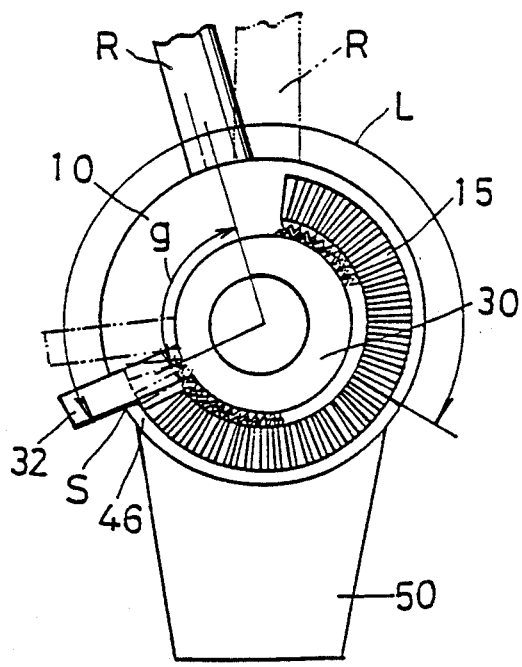
FIGS. 7(a) and 7(b) illustrate features of the holder of the invention, demonstrating its operation.

FIG. 7(a) illustrates one memory condition where the rod R supported in the rotatable part 10 may be constantly held at a selected angle g from the stop position S at all times.

When the tightening bolt 41 is loosened, the rotary part 10 rotates along with the protrusion 32 freely inside the arc-shaped part L and inside the arcuate region defined at both arcuate ends by the steps 46. When the holder is to be transported, for instance, it is only necessary for the rotatable part 10 to be rotated, and then it is fixed at its new orientation by retightening of the bolt 41, so that the rod R may come to the position indicated by a broken line where it will not be a laterally projecting obstacle. In this case, the memory ring gearing surface 33 remains in mesh with the gearing surface 16 in the rotatable part and has rotated with it. Restoring the original orientation of the rotatable part is easy. The bolt 41 is only slightly loosened and the memory ring 30 is rotated by its protrusion 32, which rotates the rotatable part to restore its previous orientation.

If the tightening bolt 41 is further loosened, the memory ring 30 is axially pushed outward to the open large diameter part 17 of the gearing surface inside the arcuately shaped protrusion 15 by the spring 35, as shown in FIG. 6. This releases the gear mesh between the memory ring gearing surface 33 and the gearing surface 16 on the inner periphery of the protrusion 15, as shown in FIG. 2 or 6. It is now possible to change the angular position of the memory ring operating protrusion 32 as compared with the position of the rotatable part 10.

Figure 7B:
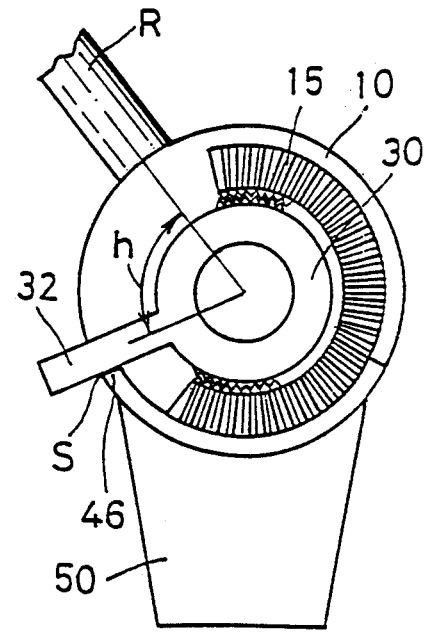

FIG. 7(b) shows an example where the position of the memory ring operating protrusion 32 has been changed in such a fashion that the rod R may be held at an angle h, which is smaller than the angle g from the stop position S.

When the tightening bolt 41 is tightened once again, the memory ring 30 is pushed axially to engage the gearing surface 16 on the inner periphery of the protrusion 15 by means of the holding part 45.

The position memorization mechanism for the rotatable part in a holder of the present invention is capable of easily memorizing the angular orientation of the rotatable part as compared with that of the fixed part by means of the operating protrusion of the memory ring, with simply a single touch being required for restoring the holder to a preset orientation.

In the foregoing, the present invention has been described solely in connection with preferred illustrative embodiments thereof. Since many variations and modifications of the present invention will now be obvious to those skilled in art, it is preferred that the scope of this invention be determined not by the specific disclosure herein, but only by the appended claims.

What is claimed is:

1. A position memorizing mechanism for establishing and memorizing the angular orientation of a rotatable part with respect to a fixed part of a holder for an article, the mechanism comprising:
    a relatively fixed part, having a front side; a stop defined on the front side of the fixed part;
    a relatively rotatable part having a rear side; means supporting the rear side of the rotatable part at the front side of the fixed part and enabling relative rotation of the rotatable part with respect to the fixed part;
    a first engagement surface on the rear side of the rotatable part, a cooperating second engagement surface on the front side of the fixed part, and the first and second engagement surfaces being engageable for locking the rotatable part against rotation with respect to the fixed part when the fixed and rotatable parts are secured together;
    securing means between the fixed and the rotatable parts for drawing them together for moving the first and second engagement surfaces into engagement and also for enabling the fixed and rotatable parts to move slightly apart for disengaging the first and second engagement surfaces;
    a rearwardly projecting protrusion on the rotatable part, the protrusion including third engagement surface thereon, the third engagement surface having a first smaller diameter section spaced further away from the rear side of the rotatable part, the protrusion having a second greater diameter section spaced further toward the rear side of the rotatable part;
    memory means supported at the rotatable part including a fourth engagement surface on the periphery of the memory means engageable with the third engagement surface of the protrusion, the fourth engagement surface having a diameter such that it engages the third engagement surface when the memory means is at the first small diameter section of the third engagement surface and such that it disengages from the third engagement surface when the memory means is at the second greater diameter section of the protrusion with the third and fourth engagement surfaces in engagement while the securing means is adjusted to move the first and second engagement surfaces apart from engaging one another, the memory means is rotatable with respect to the fixed part while the memory means fourth engagement surface is in engagement with the rotatable part third engagement surface such that the memory means rotates together with the rotary part; the securing means being further releasable to also release the engagement between the third and fourth engagement surfaces;
    stop engagement means on the memory means for engaging the stop on the fixed part when the memory means is rotated to an orientation at which the stop engaging means engages the stop, and the memory means being rotatable with respect to the fixed part for the stop engagement means to be off the stop.

2. The mechanism of claim 1, further comprising biasing means for normally biasing the memory means toward the rear side of the rotatable part, such that when the securing means is released enough to enable the rotatable and fixed parts to be moved to release the engagement between them, the memory means is moved toward the second section of the protrusion which is at the second diameter.

3. The mechanism of claim 2, wherein the third and fourth engagement surfaces respectively comprise cooperating third and fourth gearing; the first diameter of the third gearing is selected to cooperate with the diameter of the fourth gearing so that they mesh when the memory means is at the first section of the fourth engagement surface.

4. The mechanism of claim 3, wherein the third engagement surface third gearing extends rearwardly along the protrusion from the first section of the third gearing to the second section of the protrusion; the third gearing tapers wider in radial size from the first diameter to the second diameter.

5. The mechanism of claim 2, wherein the memory means comprises a ring; a guide protrusion projecting from the rotatable part and the memory means ring being supported on the guide protrusion.

6. The mechanism of claim 2, wherein the stop engagement means comprises a radial protrusion from the memory means which projects radially sufficiently that it engages the stop as the memory means is rotated to a particular angular orientation.

7. The mechanism of claim 6, wherein the memory means radial protrusion protrudes radially beyond the periphery of the rotatable part and the periphery of the fixed part and is there observable and manually engageable for rotating the memory means.

8. The mechanism of claim 2, wherein the first engagement surface comprises first gearing on the rear side of the rotatable part and the second engagement surface comprises cooperating second gearing on the front side of the fixed part.

9. The mechanism of claim 8, wherein the first gearing of the first engagement surface define an arcuate shape less than the entire circumference of the rotatable part.

10. The mechanism of claim 9, wherein the second gearing of the second engagement surface comprise arcuate segments of gearing, the arcuate segments being angularly spaced apart.

11. The mechanism of claim 3, wherein the memory means comprises a memory ring, the memory ring having a periphery and the fourth gearing being on the periphery of the memory ring; the rearwardly projecting protrusion on the rotatable part extending toward the fixed member, with the protrusion of the rotatable part being sleeve-like and having an interior defining an opening in which the memory ring is disposed and having an interior periphery on which the third gearing is defined.

12. The mechanism of claim 11, wherein the third gearing in the protrusion is arcuate in shape defining an arc less than the complete circumference of the rotatable part, providing clearance for the memory means stop engaging means to project past the radial location of the third gearing and radially outward to the stop, and the stop being radially outward of the third gearing.

13. The mechanism of claim 2, further comprising the fixed part having pressing means for engaging the memory means and for pushing the memory means in opposition to that of the biasing means upon the memory means, the pressing means moving the memory means so that the third and fourth engagement surfaces engage when the securing means sufficiently tightens the fixed and rotary parts together.

14. The mechanism of claim 2, further comprising means on the rotatable part for selectively clamping and releasing a rod on the rotary part.

15. The mechanism of claim 2, further comprising a support post connected to the fixed part.

* * * * *